United States Patent Office 2,944,996
Patented July 12, 1960

2,944,996

RESINOUS CONDENSATION PRODUCT OF A POLYEPOXYPOLYETHER RESIN AND A HYDROXYL-TERMINATED POLYESTER AND METHOD OF MAKING SAME

Morris B. Berenbaum, Levittown, Pa., assignor to Thiokol Chemical Corporation, Trenton, N.J., a corporation of Delaware No Drawing. Filed June 7, 1956, Ser. No. 589,856

6 Claims. (Cl. 260—45.4)

This invention relates to polyesters that are useful in modifying epoxide resins and to a method of preparing such polyesters, as well as to polyepoxide-polyester copolymers and a method for making them.

It is well known that polyepoxide resins, which are available on the market as "Epon," "Araldite" and "BRR" resins and are characterized by the presence of two or more terminal epoxide groups, possess many useful properties. They are generally prepared by reacting epichlorhydrin with a polyhydric phenol or alcohol, e.g., hydroquinone, resorcinol, glycerin, or a condensation product of a phenol with a ketone. Thus, for example, the reaction of epichlorhydrin with bis-(4-hydroxyphenyl)-2,2-propane will result in the formation of an epoxy resin having the general formula

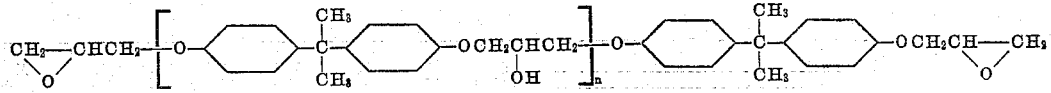

in which $n$ has an average value varying from about zero to about seven. Resins of this type are generally quite brittle and have rather poor impact resistance. It has been proposed, therefore, to modify the polyepoxide resins by addition thereto of other polymers. Thus, for example, it is known that resins having improved impact resistance and tensile strength can be prepared by reacting polyepoxides with mercaptan-terminated polysulfide polymers. It has also been suggested that polyepoxide resins can be improved by reacting them with carboxyl-terminated polyesters.

The surprising discovery has now been made that copolyesters having terminal groups that are predominantly hydroxyl and are prepared by reaction of diethylene glycol and propylene glycol with phthalic acid or anhydride and adipic acid, one or both glycols being used in molar excess, have outstanding superiority as modifying agents for polyepoxide resins.

In the preparation of the copolyester, the order in which the component monomers are reacted with one another is not significant. Thus, it has been found that substantially the same results are obtained whether the two glycols and the two acids are combined to form a four-component mix which, upon heating, forms the copolyester, or whether a polyester of one of the glycols and one of the acids is blended with a polyester of the other glycol and acid and the blend is then heated. Furthermore, it is possible to prepare the hydroxyl-terminated copolyester by first forming a carboxyl-terminated copolyester and then reacting it with excess glycol. While the invention is not to be limited by any theory advanced herein, it is believed that the two glycols and the two acids arrange or rearrange themselves when the four monomer components or any two polyester components are heated together so that in the final copolyester there is a random arrangement of the various monomer residues.

Contrary to expectations, it has been found that the hydroxyl-terminated copolyesters of the invention react more rapidly with polyepoxides than do the corresponding carboxyl-terminated copolyesters. It is to be understood that the term "hydroxyl-terminated copolyester" as used in this application refers to copolyesters in which a substantial majority of the reactive groups are hydroxyl groups and may include copolyesters having minor proportions of other reactive groups such as, for example, carboxyl groups.

The copolymers or copolyester-modified polyepoxide resins of the invention may be used for a wide variety of purposes including cable seals, electrical plug connectors, printing plates, insulation for electrical conductors, impregnation of leather, blending with various types of rubber, lamination, coating and related arts. Generally speaking, the copolymers of the invention are useful for every purpose in which flexibilized epoxide resins can be used.

In accordance with the invention, the copolyester is prepared by reacting diethylene glycol, propylene glycol, a phthalic acid or anhydride, and adipic acid under such conditions, i.e., with an excess of one or both of the glycols present, as to produce a copolyester having predominantly hydroxyl terminal groups. The specific properties of the copolyester may be varied somewhat by varying the relative molar proportions of the four essential components. For optimum properties, it is generally desirable that the propylene glycol and diethylene glycol residues be present in approximately equimolar proportions and that the phthalic acid and adipic acid residues likewise be present in approximately equimolar proportions. These proportions may, however, be varied within the range of approximately 1:2 to 2:1, i.e., either glycol residue may be present in twice the molar amount of the other and either acid residue may likewise be present in twice the molar amount of the other. It is important, however, that the molar proportion of total glycols be somewhat in excess of the total molar proportion of acids in order to produce a copolyester having predominantly terminal hydroxyl groups. While this molar ratio may also vary widely, depending primarily upon the average length of the copolyester molecule or the number of groups intermediate the terminal hydroyl groups that is desired, excesses ranging from as little as about 3½ to as high as about 30%, on a molar basis, of glycols over acids have been found to give most uniformly satisfactory results. A 10 to 20 mol percent excess is generally sufficient.

In accordance with one embodiment of the method for preparing the copolyester of the invention, weighed quantities of phthalic and adipic acids and an excess of diethylene glycol and propylene glycol are mixed and heated together, preferably under a slight positive pressure of nitrogen. The water of condensation is removed, e.g., by means of a water-entraining liquid such as xylene admixed with the reactants, and the polymerization is carried out until the desired degree of completion, as measured by the amount of water removed, is attained. The temperature during the reaction increases gradually from about 120° C. to 190° C. At the end of the reaction, heating is discontinued, the mixture is cooled to about 120° C., suction is applied and the water-entraining liquid is removed under vacuum.

It is also within the scope of the invention to prepare the copolyester by a vacuum technique which involves heating the dicarboxylic acids and the glycols for one to two hours at about 130° C. before the application of a vacuum so as to minimize the chances of removing glycol monomers with the water of condensation. After this initial heating period, vacuum is applied and the water of condensation is collected with the pressure set at approximately 100 mm. Hg. As the degree of polymerization increases, the reaction mixture becomes more viscous and the rate of removal of water slows down. To compensate for this, the pressure is gradually reduced to about 25 mm. Hg and maintained at that level until the amount of water collected corresponds to the amount expected with the desired degree of conversion. The vacuum is then released and heating is continued for several hours at 130° C.

To combine the copolyesters of the invention with polyepoxide resins, it is generally desirable to heat the components separately to a temperature of approximately 100° C. until their viscosity becomes low enough to insure easy pouring and thorough mixing. After thorough mixing, the catalyst is added and the mixture is cast or molded while it is still hot. After this, the material is maintained at an elevated temperature, usually of the order of about 70° C., to complete the cure.

The proportion of copolyester to polyepoxide resin may vary considerably depending upon the particular results desired. Thus, if characteristics closely resembling that of the unmodified epoxide resins are desired, the proportion of copolyester will be relatively low. If on the other hand a flexible product is desired, in which tensile strength is not significant and high extractability of the copolyester is not important, the proportion of copolyester may be relatively high. Tests have indicated that desirable results are generally obtained where the proportion by weight of copolyester to epoxide resin is between about 2:1 and 1:3. The proportion that is optimum for most purposes is approximately 1:2.

It is desirable, in blending the copolyester with epoxide resin, to add a catalyst either initially or after some mixing and possibly heating. The catalyst is preferably an amine, e.g., 2,4,6-tri(dimethylaminomethyl)phenol, available on the market under the tradename "DMP-30," diethylene triamine, and the like. While the amount of catalyst utilized depends upon the temperature employed as well as on the activity of the catalyst, 10% by weight, based on the amount of epoxide resin present, is generally sufficient.

The curing of the copolyester and polyepoxide resin in the presence of an amine catalyst is generally accomplished at elevated temperature for a period of time sufficient to give the product the desired properties. As is well known in the art, the time and temperature of cure may also vary widely depending upon the components of the mixture, the catalyst, and the properties desired in the product. Satisfactory results are uniformly obtained by heating the mixture to a temperature of approximately 70° C. for a period of about four hours.

The advantages and utility of the invention will become further apparent from the following detailed example illustrating the best modes now contemplated for carrying out the invention.

Example

A diethylene phthalate polyester was prepared by heating diethylene glycol and phthalic anhydride in a mol ratio of 6:5, the temperature being raised gradually to 160° C., until the water of condensation was removed. A propylene adipate polyester was similarly prepared by heating and mixing propylene glycol and adipic acid. Two copolyesters were prepared from the diethylene phthalate and propylene adipate thus prepared, one (copolyester A) being prepared by heating the two polyesters to 160° C. in equimolar proportions and the other (copolyester B) being prepared by heating the polyesters to 160° C. in a molar proportion of one mol diethylene phthalate polyester to two mols propylene adipate polyester.

A third copolyester (copolyester C) was prepared by heating six mols diethylene glycol, six mols propylene glycol, five mols isophthalic acid and five mols adipic acid, the temperature being gradually raised to 160° C., until the water of condensation had been removed.

The epoxide resin "Epon 828," having an epoxide equivalent of 190-210, was then mixed with 10% by weight (based on the weight of epoxide resin) of 2,4,6-tri-(dimethylaminoethyl)phenol ("DMP-30") as catalyst and with varying proportions of copolyester resins A, B and C as well as with diethylene phthalate and propylene adipate. Each mixture was cured by subjecting it to a temperature of 70° C. for four hours.

After the specimens were cured they were tested for tensile strength, elongation, hardness (Shore "D") and impact strength. The results are shown in the table immediately below:

| | | | | | | | | |
|---|---|---|---|---|---|---|---|---|
| Epon 828 | 100 | 100 | 100 | 100 | 100 | 100 | 200 | 300 |
| DMP-30 | 10 | 10 | 10 | 10 | 10 | 10 | 20 | 30 |
| Copolyester A | | | | 100 | | | 100 | 100 |
| Copolyester B | | | | | 100 | | | |
| Copolyester C | | | | | | 100 | | |
| Diethylene phthalate | | 100 | | | | | | |
| Propylene adipate | | | 100 | | | | | |
| Tensile Strength, p.s.i. | 8,300 | (1) | 2,810 | 3,800 | 2,960 | 4,850 | 10,700 | 12,700 |
| Elongation, Percent | 4.3 | (1) | 37 | 13 | 14.3 | 14.5 | 6.9 | 7.4 |
| Hardness | 87 | 81 | 70 | 80 | 82 | 84 | 86 | 85 |
| Impact, Withstood, ft. lbs. | 8.0 | (1) | 78.2 [2] | 31.6 | 9.4 | 21.4 | 18.8 | 15.9 |
| Impact, Broke, ft. lbs. | 9.2 | 0.9 | (3) | 37.6 | 11.9 | 23.9 | 19.9 | 18.8 |

[1] Too brittle to be tested.
[2] Maximum impact available for test.
[3] Too flexible to rupture.

These data indicate that the copolyester of the invention is more effective than either diethylene phthalate or propylene adipate alone in modifying the epoxide resin for the purpose of increasing its impact strength and flexibility without seriously impairing its tensile strength. With somewhat less than maximum increase in impact strength, the data also show that improved flexibility and tensile strength are obtainable when the proportion of copolyester to epoxide resin is reduced to below 1:1, i.e., as low as 1:3 and that some increase in impact strength and significant increase in flexibility is obtainable when the proportion of diethylene phthalate to propylene adipate in the copolyester is as low as 1:2.

It is to be understood that numerous modifications will occur to those skilled in the art upon reading this description. All such modifications are intended to be included within the scope of the invention as defined in the accompanying claims.

I claim:

1. A resinous condensation product of (A) a resinous reaction product of an epihalohydrin with a member of the group consisting of polyhydric phenols and polyhydric alcohols with (B) a hydroxyl-terminated copolyester of diethylene glycol, propylene glycol, adipic acid and a member of the group consisting of phthalic acid, isophthalic acid and the anhydrides thereof, the relative molar proportion of the glycols in the copolyester being between about 1:2 and 2:1, the relative molar proportion of the acidic components in the copolyester being between about 1:2 and 2:1, the total glycols in the copolyester being present in a molar excess of between about 3.5 and 30% in relation to the acidic components and the proportion by weight of the copolyester to resinous condensation product ranging between about 2:1 and 1:3.

2. A resinous condensation product of (A) a resinous reaction product of an epihalohydrin with a member of the group consisting of polyhydric phenols and polyhydric alcohols with (B) a hydroxyl-terminated copolyester of diethylene glycol, propylene glycol, adipic acid and phthalic anhydride, the relative molar proportion of the glycols in the copolyester being about 1:1, the relative molar proportion of adipic acid and phthalic anhydride in the copolyester being about 1:1, the total glycols in the copolyester being present in a molar excess of between about 3.5 and 30% in relation to the acidic components and the proportion by weight of the copolyester to resinous condensation product ranging between about 2:1 and 1:3.

3. A composition comprising a mixture of (A) a resinous reaction product of an epihalohydrin with a member of the group consisting of polyhydric phenols and polyhydric alcohols and (B) a hydroxyl-terminated copolyester of diethylene glycol, propylene glycol, adipic acid and a member of the group consisting of phthalic acid, isophthalic acid and the anhydrides thereof, the relative molar proportion of the glycols in the copolyester being between about 1:2 and 2:1, the relative molar proportion of the acidic components in the copolyester being between about 1:2 and 2:1, the total glycols in the copolyester being present in a molar excess of between about 3.5 and 30% in relation to the acidic components and the proportion by weight of the copolyester to resinous condensation product ranging between about 2:1 and 1:3.

4. A composition comprising a mixture of (A) a resinous reaction product of an epihalohydrin with a member of the group consisting of polyhydric phenols and polyhydric alcohols and (B) a hydroxyl-terminated copolyester of diethylene glycol, propylene glycol, adipic acid and phthalic anhydride, the relative molar proportion of the glycols in the copolyester being about 1:1, the relative molar proportion of adipic acid and phthalic anhydride in the copolyester being about 1:1, the total glycols in the copolyester being present in a molar excess of between about 3.5 and 30% in relation to the acidic components and the proportion by weight of the copolyester to resinous condensation product ranging between about 2:1 and 1:3.

5. Method which comprises mixing a resinous condensation product of (A) an epihalohydrin with a member of the group consisting of polyhydric phenols and polyhydric alcohols with (B) a hydroxyl-terminated copolyester of diethylene glycol, propylene glycol, adipic acid and a member of the group consisting of phthalic acid, isophthalic acid and the anhydrides thereof wherein the relative molar proportion of the glycols to one another is between about 1:2 and 2:1, the relative molar proportion of the acidic components in the copolyester is between about 1:2 and 2:1, and the total glycols are present in a molar excess of between about 3.5 and 30% in relation to the acidic components, the proportion by weight of the copolyester to resinous condensation product ranging between about 2:1 and 1:3, and heating said mixture to a temperature of about 70° C. for a period of about four hours to produce a cured and solid, modified resinous condensation product.

6. Method which comprises mixing a resinous condensation product of (A) an epihalohydrin with a member of the group consisting of polyhydric phenols and polyhydric alcohols with (B) a hydroxyl-terminated copolyester of diethylene glycol, propylene glycol, adipic acid and phthalic anhydride wherein the relative molar proportion of the glycols to one another is about 1:1, the relative molar proportion of adipic acid and phthalic anhydride in the copolyester is between about 1:2 and 2:1, and the total glycols are present in a molar excess of between about 3.5 and 30% in relation to the acidic components, the proportion by weight of the copolyester to resinous condensation product ranging between about 2:1 and 1:3, and heating said mixture to a temperature of about 70° C. for a period of about four hours to produce a cured and solid, modified resinous condensation product.

References Cited in the file of this patent

UNITED STATES PATENTS

| | | |
|---|---|---|
| 1,950,468 | Zwilgmeyer | Mar. 13, 1934 |
| 1,998,744 | Ubben | Apr. 23, 1935 |
| 2,712,535 | Fisch | July 5, 1955 |
| 2,720,500 | Cody | Oct. 11, 1955 |
| 2,801,189 | Collier | July 30, 1957 |

FOREIGN PATENTS

| | | |
|---|---|---|
| 610,140 | Great Britain | Oct. 12, 1948 |